US012043051B2

(12) United States Patent
Klein

(10) Patent No.: US 12,043,051 B2
(45) Date of Patent: Jul. 23, 2024

(54) METHODS FOR TRANSFERRING COLORED MARKINGS ONTO PLASTIC SURFACES

(71) Applicant: Lacotra GmbH, Groß-Zimmem (DE)

(72) Inventor: Sylke Klein, Rossdorf (DE)

(73) Assignee: LACOTRA GMBH (DE)

( * ) Notice: Subject to any disclaimer, the term of this patent is extended or adjusted under 35 U.S.C. 154(b) by 405 days.

(21) Appl. No.: 17/430,880

(22) PCT Filed: Feb. 13, 2020

(86) PCT No.: PCT/EP2020/053671
§ 371 (c)(1),
(2) Date: Aug. 13, 2021

(87) PCT Pub. No.: WO2020/165297
PCT Pub. Date: Aug. 20, 2020

(65) Prior Publication Data

US 2022/0080760 A1 Mar. 17, 2022

(30) Foreign Application Priority Data

Feb. 15, 2019 (EP) .................................... 19157397
Mar. 21, 2019 (EP) .................................... 19164306

(51) Int. Cl.
*B41M 5/26* (2006.01)
*B41M 5/00* (2006.01)
*B41M 5/46* (2006.01)
*B41M 5/382* (2006.01)
*B41M 5/392* (2006.01)
*B41M 5/41* (2006.01)
*B41M 5/42* (2006.01)

(52) U.S. Cl.
CPC .......... *B41M 5/267* (2013.01); *B41M 5/0064* (2013.01); *B41M 5/465* (2013.01); *B41M 5/382* (2013.01); *B41M 5/392* (2013.01); *B41M 5/41* (2013.01); *B41M 5/42* (2013.01); *B41M 2205/08* (2013.01); *B41M 2205/30* (2013.01)

(58) Field of Classification Search
CPC ...... B41M 5/267; B41M 5/465; B41M 5/392; B41M 2205/08; B41M 2205/30; B41M 5/0064; B41M 5/382; B41M 5/41; B41M 5/42
See application file for complete search history.

(56) References Cited

U.S. PATENT DOCUMENTS

| | | | | |
|---|---|---|---|---|
| 2001/0003642 A1* | 6/2001 | Chang | B41M 5/44 430/276.1 |
| 2007/0082288 A1* | 4/2007 | Wright | H10K 71/18 430/200 |
| 2008/0014528 A1 | 1/2008 | Bailey et al. | |

* cited by examiner

*Primary Examiner* — Henok D Legesse
(74) *Attorney, Agent, or Firm* — Dentons Davis Brown; Matthew Coryell

(57) ABSTRACT

The invention relates to a method for transferring colored markings or labels onto plastic surfaces by means of a laser beam, to a transfer medium for carrying out said method and to articles, the plastic surfaces of which are laser-marked or laser-labeled by way of such a method.

18 Claims, 2 Drawing Sheets

METHODS FOR TRANSFERRING COLORED MARKINGS ONTO PLASTIC SURFACES

The present invention relates to a method for transferring colored markings or labels onto plastic surfaces by means of a laser beam, to a transfer medium for carrying out said method and to articles, the plastic surfaces of which are laser-marked or laser-labeled by way of such a method.

"Colored" markings or labels in the context of the present invention refer to all permanent markings of all kinds that can be obtained by laser action on plastics or plastic surfaces using all colored and achromatic colorants (all colors, including black, white and all gray tones). Colorants are color pigments or dyes.

According to the invention, the terms "label" and "marking" comprise any type of marking by the laser, i.e., labeling, marking, coding, drawing, decorating, etc.

"Plastic surfaces" refer to the surfaces of plastic bodies and/or surfaces of plastic layers. These plastic bodies and plastic layers comprise solid and hollow bodies consisting exclusively of plastics, partially solid and partially hollow bodies consisting of plastics in combination with other materials, as well as plastic films which consist either exclusively of plastics or of plastic composite materials, i.e., having at least one surface made of plastic on other materials such as paper, pasteboard, cardboard, laminates, metal, wood, stone, etc.

The plastic surfaces can consist of all known amorphous and partially crystalline thermoplastic and thermosetting materials.

With the help of laser beams of different wavelengths, it is possible to permanently label materials and production goods with plastic surfaces of the type mentioned.

Achromatic labels, i.e., white and black labels and labels comprising all gray tones, can be caused by chemical reactions on the plastic surfaces or in the plastic bodies/plastic layers themselves, such as carbonization or foaming, but also through reactions of plastic additives, such as their darkening/bleaching or evaporation/atomization (e.g., of laser-sensitive nanoparticles).

Colored plastic labels can be achieved by the action of laser energy on the plastic surface itself (intrinsic label) or on a labeling medium that is transferred from the outside to the plastic surface to be labeled (extrinsic label).

The intrinsic colored labeling of the plastic surface can be achieved, for example, by the following reactions of the dyes/color particles contained in the plastic:

- laser-activated formation of blue diacetylene chromophores and subsequent laser-assisted generation of color transitions on leuco dyes (EP 2776250 B1);
- reaction of leuco dyes with laser-excited acid generators (EP 1809484 B1, WO 2007088104 A1);
- laser-wave-dependent bleaching of chromophoric particles (EP1230092 B1, DE102006034854 A1, WO 03/095226 A1);
- laser-induced bleaching of a radiation-sensitive additive (e.g., azo and/or indanthrone pigments) in combination with less radiation-sensitive, non-bleaching compounds such as inorganic and/or organic pigments and/or polymer-soluble dyes (EP0327508 A1);
- color generation/change through laser-assisted deagglomeration of nanocomposites, e.g., PMMA/nano-gold (A. Schwenke, L. Sajti, B. Chichkov, Kunststoffe 7 (2015), p. 43) or by laser-assisted generation/transfer of metal nanoparticles, such as nano-silver/gold/copper, which are embedded in a matrix. However, in this case, only markings on glass, ceramic and aluminum surfaces are possible, DE 102005026038 A1.

The extrinsic colored labeling of a plastic surface is made possible, for example, by the laser-assisted fusing of an applied color powder with the plastic surface (DE 112009003380 A1) or by the laser-assisted connection of a mixture of energy-absorbing material/glass frit/metal oxides/organic pigments with the plastic surface. This mixture can be applied as a powder or a layer on the plastic surface or applied to a separate carrier and subsequently be brought into contact with the plastic surface (e.g., WO 99/16625 A1, U.S. Pat. No. 6,075,223 B2; U.S. Pat. No. 6,313,436 B2, EP 1023184 B1, U.S. Pat. No. 6,238,847 B2, WO 99/25562 A1, or DE10152073 A1).

WO 2005/047010 A1 describes the extrinsic colored labeling of a plastic surface by welding a polymer-containing colored labeling medium to the plastic surface, wherein the labeling medium, which contains a colorant, is located on a carrier layer which contains an energy absorber. The labeling medium contains a polymer component that is softened or melted by means of laser energy and is welded together with the colorant to the receiving plastic surface. In WO 2005/097514 A1 and DE102007005917 A1, the desired color layer is also transferred by means of an extrinsic labeling medium. In WO 2005/097514 A1, this is a layer package of absorber/separation/sealing/color layer on a carrier film, which is transferred in one or two stages; in DE102007005917 A1, it is a layer package of absorber/separation/color/adhesive layer on a carrier film.

The advantage of these three methods compared to the other extrinsic labeling methods described above is that the color layer is not changed in color tone or color fastness by the introduced laser energy or other added components and is retained even after the laser process.

However, the direct close contact between the labeling medium and the plastic surface is necessary for the color transfer, e.g., by applying a vacuum, which limits this method to labeling flat, smooth and/or convex surfaces. In the case of concavely curved or rough surfaces, hollow spaces are created between the plastic surface and the labeling medium, where no color transfer can take place. Furthermore, the labeling speed is limited because a specific process time is required for the labeling medium to be detached (e.g., thermal softening of the detaching layer).

Therefore, the problem addressed by the present invention is that of providing a method for a contact-free colored marking or labeling on plastic surfaces by means of a laser beam, which can be used regardless of the surface geometry or quality of the plastic surface to be processed, which can be used at high write speeds of the laser beam and allows for adherent and abrasion-resistant markings/labels in a wide range of colors.

A further problem addressed by the present invention is that of providing a transfer medium which allows the aforementioned method to be carried out in high quality and at a high write speed of the laser beam.

Furthermore, an additional problem addressed by the invention is that of providing an article having a plastic surface which is laser-marked or laser-labeled by means of the method mentioned.

The problem addressed by the present invention is solved by a method for transferring colored markings or labels onto plastic surfaces by means of a laser beam, wherein a multilayer planar transfer medium, having at least

- one carrier layer (1) containing at least one material which absorbs energy emitted by the laser beam, one metal layer (2) consisting of a sublimable metal and arranged directly on the carrier layer (1), and a labeling medium (3*) arranged directly on a side of the metal layer (2) facing away from the carrier layer (1) and containing at least one color component, is contacted from the side of the carrier layer (1) on a defined surface unit with a pulsed laser beam, wherein the metal of the metal layer completely sublimates in a locally selective manner and the labeling medium (3*) is simultaneously detached from the carrier layer in a locally selective manner, and wherein the labeling medium detached from the carrier layer is transferred to the plastic surface in an adherent manner.

Furthermore, the problem addressed by the invention is solved by a transfer medium for the adherent transfer of colored markings or labels onto plastic surfaces by means of a laser beam, wherein the transfer medium has a multilayer structure and at least one carrier layer (1) containing at least one material which absorbs energy emitted by the laser beam, one metal layer (2) consisting of a sublimable metal and arranged directly on the carrier layer (1), and a labeling medium (3*) arranged directly on a side of the metal layer (2) facing away from the carrier layer (1) and containing at least one color component.

In addition, the problem addressed by the invention is solved by an article having a plastic surface which is laser-marked or laser-labeled in color by means of the above-mentioned method.

Surprisingly, it has been found that a transfer medium having a thin metal layer (2) between a carrier layer (1) absorbing the laser energy and a labeling medium (3*) located thereon that contains the color component to be transferred, which on contact sublimates with the laser beam in a locally selective manner, is excellently suited for use in a method for transferring colored markings by means of a laser beam, and that the corresponding method completely solves the problem addressed by the invention.

If a laser beam of sufficient energy is directed onto the rear side of a carrier layer (1) which, according to the present invention, contains at least one material absorbing the energy emitted by the laser beam, the laser energy coupled into the carrier layer is transferred to a large extent to the thin metal layer (2) applied to the front side of the carrier layer. The thin metal layer immediately sublimates at the contact surface of the laser beam over its entire present volume, wherein enough acceleration energy is generated that the entire labeling medium (3*), which is arranged on the metal layer, regardless of how many individual layers it is composed of, is completely detached from the carrier layer and transferred in its entirety to a plastic surface to be marked/labeled. After this process, the entire labeling medium is permanently bonded to the plastic surface.

It has been found that no direct close contact between the labeling medium and the plastic surface to be marked/labeled is necessary to carry out this method, since the labeling medium can overcome a specific distance from the plastic surface due to the acceleration energy from the sublimation process. Said distance can be 1 to 100 μm, in particular 5 to 75 μm.

The sublimation process itself refers to the direct transformation of a substance from the solid to the gaseous state without passing through the liquid state of aggregation. In the method according to the present invention, the thin metal layer is immediately transformed into the gaseous state by the laser energy introduced. The metal vapor that forms explosively in this way completely detaches the labeling medium from the carrier layer. The labeling medium is also completely transferred to the receiving substrate or the plastic surface to be marked/labeled and is then permanently connected to the plastic surface after the actual laser process.

The sublimation of the metal layer takes place in the shortest possible interval and thus allows for high process speeds, such as those required for the so-called "marking on the fly." Furthermore, the sublimation of the metal layer for the labeling medium surprisingly takes place virtually residue-free, i.e., the metal sublimate does not cause any visible discoloration, deposits or contamination on the colored label on the plastic surface to be marked/labeled.

The carrier layer (1) consists of a base material that is transparent to the laser energy, for example, made of glass or plastics which are ideally available in the form of films, tapes or plates. The base material of the carrier layer preferably consists of plastics. The carrier layer can have a single-layer or a multilayer structure. In order to be able to ensure a flexible process structure and the marking or labeling of plastic surfaces regardless of their surface geometry or quality, it is advantageous if the carrier layer (1) is a polymer film which in turn can have a single-layer or a multilayer structure.

All flexible base materials can be used as materials for the individual layers of a carrier film, which, by adding suitable additives, effectively absorb the laser light and are not damaged or destroyed by the interaction with the laser light.

Suitable materials include plastics, which are ideally used in the form of flexible films and preferably have film thicknesses of 4-250 μm, in particular 6-150 μm and very particularly preferably 10-75 μm.

Suitable plastics for this purpose are preferably thermoplastics. In particular, the plastic films can be made from the group of polyesters such as polycarbonate, polyester carbonate, polyethylene terephthalate, polybutylene terephthalate, polyethylene naphthalate; of polyimides, polyacetals, polyethylene, polypropylene, polyamides, polyether esters, polyphenylene ethers, polyvinyl chloride, polystyrene, acrylonitrile butadiene styrene, acrylonitrile styrene acrylic esters, polyethersulfones and polyetherketones as well as their copolymers. Multilayer composites made from the aforementioned film plastic are also suitable.

In particular, of the plastics mentioned, polyethylene terephthalate (PET), polyethylene naphthalate (PEN), polyethylene (PE), polypropylene (PP, e.g., BOPP: biaxially-oriented PP or CPP: cast PP), polycarbonate (PC) and polyimide (PI) are particularly preferred.

By means of suitable additives, the carrier layer (1) is put into the state of absorbing the energy emitted by the laser beam on the surface facing the laser, herein referred to as the rear side. This necessary absorption of the laser energy is made possible by laser-absorbing materials which can either be incorporated directly into the film during film production (e.g., extruded) or applied to the film in separate layers in a suitable binder. The carrier layer is preferably designed as a single-layer polymer film and the laser-absorbing material is incorporated directly into the film.

Suitable laser-absorbing materials are all materials that sufficiently absorb the laser light energy in the emitted wavelength range and convert it into thermal energy. These materials are preferably based on carbon, carbon black, anthracene, on IR-absorbing colorants such as perylenes/rylenes, pentaerythritol, on phosphates such as copper hydroxide phosphates, on sulfides such as molybdenum disulfide, on oxides such as antimony (III) oxide, iron oxides, bismuth oxychloride; on plate-like materials such as sheet silicates, synthetic or natural mica, talc, kaolin or graphite. These plate-like materials can also be used when coated with metal oxides, such as iron oxide, antimony or indium-doped tin oxides, tin oxides, aluminum oxide, titanium dioxide and/or silicon dioxide.

The material absorbing the energy emitted by the laser beam can also be a mixture of two or more of the components mentioned.

Biaxially-oriented polyethylene terephthalate (PET), polypropylene (BOPP or CPP), or polyethylene naphthalate (PEN) polymer films colored with carbon, carbon black, or anthracene have proven particularly suitable for the carrier layer (1).

The material (laser absorber) absorbing the energy emitted by the laser beam is contained in the carrier layer in a concentration of 2 to 50 wt. %, preferably 5-30 wt. %, based on the mass of the carrier layer. This specification relates to both a single-layer and a multilayer carrier layer.

The laser absorber is preferably incorporated as a component of the carrier layer during its production, for example, by extrusion, and is located in at least one of the layers of the carrier layer.

The irradiated laser energy is converted into thermal energy by the laser-absorbing materials in the carrier layer, which is transferred on the coated side of the carrier layer (1) facing away from the laser beam, herein referred to as the front side, to a very thin metal layer (2) which consists of a sublimable metal. This metal layer can theoretically consist of all known metals, since the laser energy introduced by the laser beam used lies well above the necessary enthalpies of sublimation $\Delta H_{sub}$ for almost all possible metals in question (see Table 1). In practice, aluminum, magnesium, copper, tin, zinc and possibly silver are preferably used for reasons of cost and process technology. Aluminum is particularly preferably used.

TABLE 1

| Metal | Symbol | M [g/mol] | Molar $\Delta H_{sub}$ [kJ/mol] | Specific $\Delta H_{sub}$ [kJ/g] |
|---|---|---|---|---|
| Aluminum | Al | 26.98 | 304.7 | 11.3 |
| Magnesium | Mg | 24.30 | 136.74 | 5.6 |
| Copper | Cu | 63.55 | 313.11 | 4.9 |
| Tungsten | W | 183.84 | 859.4 | 4.7 |
| Tin | Sn | 118.71 | 303.4 | 2.6 |
| Silver | Ag | 107.87 | 266.3 | 2.5 |
| Zinc | Zn | 65.39 | 126.3 | 1.9 |
| Gold | Au | 196.97 | 355.8 | 1.8 |

Molar and specific enthalpies of sublimation of metals in descending order of the specific enthalpies of sublimation (Sources: Handbook of Chemistry and Physics, 78th edition, 1997-1998, D. R. Lide, and website: http://www.periodensystem-online.de/index.php?el=13&id=bonds)

As will be described in more detail below, only specific types of lasers come into consideration for the method according to the invention, which emit at specific wavelengths and are operated in the pulsed mode, so that the energy introduced into the carrier layer (1) is sufficient to sublimate the metal of the metal layer (2). With these lasers, the frequency-dependent pulse energy must generate an energy input into the metal layer that is greater than the specific enthalpy of sublimation $\Delta H_{sub}$ of the metal of the metal layer.

When the pulsed laser beam acts on the carrier layer (1) and subsequently on the metal layer (2), the energy required for the direct transition from the solid metal to the gaseous metal vapor is introduced into the system for the entire volume of the metal layer, which is located locally selectively below the contact surface of the laser beam. The minimum energy of a laser pulse (=pulse energy) required to carry out the method according to the invention must therefore be greater than the specific enthalpy of sublimation required, e.g., greater than 11.3 kJ/g for aluminum (see Table 1).

The pulse energy of a laser pulse is calculated as the quotient of the mean output power divided by the pulse frequency. For example, with an Nd-yttrium vanadate solid-state laser (1064 nm, 10 W output power), pulse energies of 0.2-0.38 mJ are achieved at frequencies of 5-60 kHz and coupled into the metal layer. For example, with a fiber laser (1062 nm, 50 W output power), a pulse energy of 1 mJ is achieved at frequencies of 2-50 kHz.

The lasers suitable for the colored plastic labelling in accordance with the method according to the invention are pulsed solid-state and/or fiber lasers with wavelengths of 534 nm (green laser) and 1064/1062 nm (NIR laser, near infrared). Pulsed solid-state and/or fiber lasers with wavelengths of 1064 nm and 1062 nm are particularly suitable, e.g., solid-state lasers with 1064 nm consisting of Nd:YAG or Nd:yttrium vanadate single crystals or fiber lasers with 1064/1062 nm according to the double core concept, consisting of a highly pure, active quartz glass core doped with Ge, Al, or P and rare earth ions (e.g., $Nd^{3+}$, $Er^{3+}$ or $Yb^{3+}$), surrounded by a quartz glass pump core with a smaller refractive index. The advantages of the fiber laser for the colored plastic labeling are the higher beam quality, marking speed and service life when compared to solid-state lasers.

If the same lasers are operated in continuous mode, the energy coupled into the transfer medium is insufficient for the sublimation of a metal layer of the same thickness on the contact surface of the laser beam. Even the use of a $CO_2$ laser does not lead to the desired success.

It goes without saying that the energy emitted by the laser beam in pulsed mode for sublimation of the metal located on the front side of the carrier layer (1) in the metal layer (2) at the contact point of the laser beam is only sufficient if the volume that the metal layer has in the contact area of the laser beam can be evaporated accordingly. For this purpose, a thin metal layer is required, since the surface unit contacted by a single laser beam is usually written into the transfer medium by the apparatus used. The layer thickness of the metal layer should be less than 10 μm and therefore lie in the range from 1 to <10,000 nm. In particular, the upper limit of the layer thickness of the metal layer is significantly less, namely in the range of maximally 200 nm. Layer thicknesses of less than 1 nm cannot provide the acceleration energy required to detach the labeling medium when sublimating the metal layer. A layer thickness range of 3 to 50 nm has proven to be very particularly preferred.

If, for example, the volume of the metal layer covered by the laser beam is calculated for a metal layer with a thickness of 50 nm and a laser beam diameter of 10 μm, the result is $3.93*10^{-12}$ $cm^3$.

If aluminum is used as the metal, a density of 2.7 $g/cm^3$ results in a mass to be sublimated of $1.06*10^{-11}$ g. The enthalpy of sublimation required hereto is $0.12*10^{-6}$J, which is already provided by the energy introduced by a single laser pulse of the laser types specified above. However, if gold is used as the metal, a density of 19.3 $g/cm^3$ results in a mass to be sublimated of $7.59*10^{-11}$ g. However, the enthalpy of sublimation required hereto of $0.14*10^{-6}$ J also lies in the same order of magnitude as for aluminum and below the laser pulse energy.

The thin metal layers can be applied to the carrier layer (1) using known PVD (physical vapor deposition) processes such as thermal evaporation in a high vacuum, cathode atomization or sputtering (e.g., magnetron sputtering). The preferred layer thickness ranges of the metal layer have already been set out above. It goes without saying that layer thicknesses in the low specified range are preferably used, which is advantageous for reasons of cost both in the production of the transfer medium and in the execution of the method according to the invention. In addition, it has been found that thicker metal layers or commercially available aluminum foils are not suitable for colored plastic labeling in accordance with the method according to the invention.

Biaxially-oriented polyethylene terephthalate (PET), polypropylene (BOPP or CPP) or polyethylene naphthalate (PEN) polymer films colored black with carbon, carbon black, or anthracene have proven particularly suitable for the combination of carrier layer (1) and metal layer (2), which can be produced commercially at low cost and are vaporized with a very thin layer of aluminum as described above. Compared to other metal layers, an aluminum layer also shows a minimum in the degree of reflection in the near infrared range (above 800 nm), which leads to a particularly good coupling of the energy of the laser light into the transfer medium.

A transparent carrier layer which is not provided with a laser-absorbing material and which is coated with a metal in the specified layer thickness range, or a carrier layer which contains laser-absorbing material but is not coated with a metal layer in the specified layer thickness range, is not suitable for a method for colored plastic labeling in accordance with the present invention.

According to the invention, a labeling medium (3*) is arranged on the metal layer (2) of the transfer medium, which can have a single-layer or a multilayer structure and contains at least one color component. If the labeling medium (3*) has a multilayer structure, it contains at least one layer that contains the at least one color component (3) and at least one further layer that represents a sealing layer (3') and/or an adhesive layer (3"). In this case, a sealing layer is preferably arranged between the metal layer (2) and the layer of the labeling medium (3) containing the color component, and an adhesive layer (3") is preferably arranged on the surface of the labeling medium facing away from the metal layer (2).

All organic and inorganic colorants known to a person skilled in the art can be used as the color component for the layer of the labeling medium (3*) which contains the color component (3), hereinafter also called color layer. Colorants are (soluble) dyes and/or (insoluble) color pigments.

Particularly suitable organic colorants are carbon black, azo pigments and dyes, such as mono- and diazo pigments and dyes, polycyclic pigments and dyes, such as perinones, perylenes, anthraquinones, flavanthrones, isoindolinones, pyranthrones, anthrapyrimidines, quinacridones, thioindigo, dioxazines, indanthrones, diketopyrrolopyrroles, quinophthalones, metal-complexing pigments and dyes, such as phthalocyanines, azo, azomethine, dioxime and/or isoindolinone complexes.

Inorganic colorants are in particular metal pigments, oxide and oxide hydroxide pigments, oxide mixed-phase pigments, metal salt pigments, such as chromate, chromate molybdate mixed-phase pigments, carbonate pigments, sulfide and sulfide selenium pigments, complex salt pigments and silicate pigments, but also plate-like effect pigments such as interference, pearlescent, and color-change pigments based on inorganic plate-like substrates coated with different metal oxides such as titanium, iron-silicon, tin, chromium, cerium, zirconium, manganese, aluminum oxides or their mixed oxides.

If the labeling medium (3*) has a single-layer structure, it consists of the color layer (3) containing the color component.

The labeling medium (3*) can be applied to the metal layer (2) in one or more layers as a liquid or paste-like coating composition of respectively suitable viscosity. The labeling medium (3*) is preferably applied to the metal layer (2) in the form of a printing ink and by means of a conventional printing process. The labeling medium contains at least one colorant, a binder and, in its application form, optionally also a solvent. Further additives can optionally be included. The labeling medium (3*) is present in the transfer medium according to the invention as a single solid layer (3) or as a composite of solid layers, preferably in the layer sequence (3'), (3), (3").

All binders known to a person skilled in the art are suitable, in particular cellulose, cellulose derivatives such as cellulose nitrate, cellulose acetate, hydrolyzed/acetalized polyvinyl alcohols, polyvinylpyrrolidones, polyolefins, e.g., polypropylenes and their derivatives, polyacrylates as well as copolymers of ethylene/ethylene acrylate, polyvinyl butyrals, epoxy resins, polyesters, polyisobutylenes, polyamides.

Optionally added additives can ensure a firm connection between the color layer (3) of the labeling medium and an additional sealing layer (3') which is optionally included. These additives preferably consist of polymers and copolymers of polyvinyl acetates, methyl, ethyl, butyl methacrylates, unsaturated polyester resins or mixtures thereof.

The solvents which can usually be used in printing inks or coating compositions are suitable as solvents.

For improving the adhesion of the labeling medium to the plastic surface to be marked/labeled, the labeling medium can have an adhesive layer (3") on its surface facing away from the metal layer, which contains a low-melting polymer component as the component improving the adhesion. It preferably consists, for example, of polyesters, polycarbonates, polyolefins, polystyrene, polyvinyl chloride, polyimides, polyamides, polyacetals and copolymers of the polymers mentioned, of terpolymers of vinyl chloride, dicarboxylic acid esters and vinyl acetate or of hydroxyl, methacrylate or mixtures thereof. The polymer component can be present in dissolved form or undissolved as a fine powder and is generally present in a mixture with at least one binder. Suitable binders hereto are the binders which have already been set out above for the layer of the labeling medium containing the color component.

A sealing of the labeling medium (3*) on the marked/labeled plastic surface can be achieved with an additional sealing layer (3') which is optionally applied as part of the labeling medium between the metal layer (2) and the color layer of the labeling medium (3). This is preferably a transparent layer made of polymers which preferably have glass transition temperatures ≥90° C., in particular between 100-120° C.

This sealing layer can in particular consist of polymers of styrene, methyl methacrylate or hydroxy-functional acrylates, of PE waxes and dispersions, or of polyvinyl fluoride in conjunction with binders such as nitrocellulose.

The labeling medium (3*) generally has a layer thickness in the range from 1 to 50 μm, preferably in the range from 5 to 30 μm. If an adhesive layer (3") and/or a sealing layer (3') are integrated into a multilayered labeling medium (3*), they account in total for layer thicknesses in the range from 1 to 20 μm, preferably from 3 to 15 μm, wherein the sealing layer generally has a greater layer thickness than the adhesive layer.

In order to mark/label the receiving plastic surface according to the invention, close contact between the transfer medium and the plastic surface is not necessary. Working under a contact pressure generated mechanically or by vacuum, as is customary in the prior art for similar methods, can therefore be omitted in the method according to the invention. For a successful colored marking/labeling of a plastic surface, it is now sufficient if it has loose contact with the transfer medium and the latter is brought with its rear side into the beam path of the laser. The marking/labeling can be carried out using a mask as well as freely controllable labeling. Since the method according to the invention does not require a close connection between the transfer medium and the plastic surface and the detachment and transfer of the labeling medium by the explosively released metal vapor takes place in a very short interval, very high write speeds of the laser are possible. In general, the write speed of the laser for the method according to the invention lies in the range from 500 to 60,000 mm/s.

The present invention also relates to a transfer medium for the adherent transfer of colored markings or labels onto plastic surfaces by means of a laser beam which has a multilayer structure and at least

- one carrier layer (1) containing at least one material which absorbs energy emitted by the laser beam,
- one metal layer (2) consisting of a sublimable metal and arranged directly on the carrier layer (1), and
- a labeling medium (3*) arranged directly on a side of the metal layer (2) facing away from the carrier layer (1) and containing at least one color component.

The detailed structure of the transfer medium according to the invention has already been described above. The corresponding details naturally also apply to the transfer medium itself. In particular, the transfer medium is characterized in that a metal layer made of a sublimable metal in a suitable layer thickness is used to detach the labeling medium by means of the laser beam, wherein it is preferably a layer made of aluminum, magnesium, copper, tungsten, tin, zinc, silver or gold, having a layer thickness in the range from 1 to <10,000 nm.

The labeling medium (3*) to be transferred can have a single-layer or a multilayer structure and, if it has a multilayer structure, has at least one layer containing the color component (3) and at least one further layer containing a sealing layer (3') and/or an adhesive layer (3"). The presence of a sealing layer (3') has proven to be particularly advantageous. It can also form the labeling medium (3*) with only the color layer (3).

As already described above, the color component in the labeling medium can consist of a plurality of organic and/or inorganic colorants. It should be particularly emphasized here that, by means of the transfer medium according to the invention, it is even possible to obtain colored markings or labels on plastic surfaces which contain plate-like effect pigments, thus having their particularly specific color and effect properties.

The transfer medium according to the invention is a composite of at least 3 solid layers (carrier layer, metal layer, and labeling medium). In particular, the layer or layers of the labeling medium are present in the transfer medium in largely dry solid form or in completely dry solid form.

The present invention also relates to an article having a plastic surface which is laser-marked or laser-labeled using the method according to the present invention.

Such articles are primarily components made of plastics of all kinds for which a colored marking, e.g., of company logos, brand names or type designations for devices of all kinds, in the last production step offers considerable cost advantages when compared to the usual methods such as printing. Further application examples in which a colored marking is advantageous are, e.g., cables, plugs, switches, containers, functional parts, hoses, lids, handles, levers, type rating plates, control panels in the automotive and aircraft industries, electrical engineering/electronics and machine/apparatus engineering; labels/markings on devices, instruments, implants, containers for sample material and active ingredients of all kinds such as organ samples, analysis reagents/infusion solutions/injections etc. in medical technology; product labels and their packaging with manufacturing data, batch number, barcode, data matrix code, codes for sweepstakes/promotions, price, use-by dates, ingredients, hazard and safety information, etc., e.g., to track the value chain or to guarantee the counterfeit protection of original parts, e.g., through permanent coding that cannot be removed without destroying the plastic part; permanent marking of animal ear tags, marking of signs in agriculture and forestry as well as around containers, toys, tools, individual markings or advertising in the decorative sector. It goes without saying that this list is not exhaustive.

The present invention provides a method for transferring colored markings or labels of plastic surfaces by means of a laser beam, which can produce colored markings/labels with great line definition, in clear colors and effect colors at high operating speeds of the laser. Since a close contact between the plastic surface and the transfer medium by mechanical pressure or vacuum is not required, three-dimensional articles with an unusually shaped surface and/or greater surface roughness can also be labeled without any problems. The method according to the invention therefore represents a valuable addition to and improvement of methods for laser transfer of colored markings that are already available on the market. A transfer medium that can be used for the method according to the invention and the products produced by means of the method according to the invention offer corresponding advantages.

The present invention will now be described by means of examples of the invention but is not restricted to these examples.

EMBODIMENTS

For all examples, carrier films are used which are PET films (1) colored black with carbon black as a laser absorber and vaporized with a thin aluminum layer (2).

Depending on the layer thickness, the individual layers of the labeling medium are applied to the carrier film using commercially available printing processes such as flexo, gravure, or screen printing or knife-coating. Depending on the type of printing inks used, i.e., water-based, solvent-based or UV inks, the layers are dried or cured with UV light.

Example 1: Producing a Sealing Layer (3')

The sealing layer guarantees reliable protection of the color layer against external influences in the end application.

Variant 1: At first, a solvent mixture is prepared from 40 wt. % of methyl ethyl ketone, 23 wt. % of toluene and 10 wt. % of cyclohexanone, in which 19.5 wt. % of PMMA powder from Degussa ($T_g$: 122° C.) and 7.5 wt. % of PE wax are dissolved, and the mixture is homogenized. The mixture is applied to the aluminum-vaporized side of the black carrier film with a 60 screen dots/cm gravure printing cylinder.

Variant 2: At first, 57 wt. % of xylene is provided and 28.6 wt. % of polystyrene and 14.4 wt. % of PE wax are dissolved therein, the mixture is homogenized and then applied to the aluminum-vaporized side of the black carrier film with a 60 screen dots/cm gravure printing cylinder.

Example 2: Producing a Blue Color Layer (3)

Figure 4:
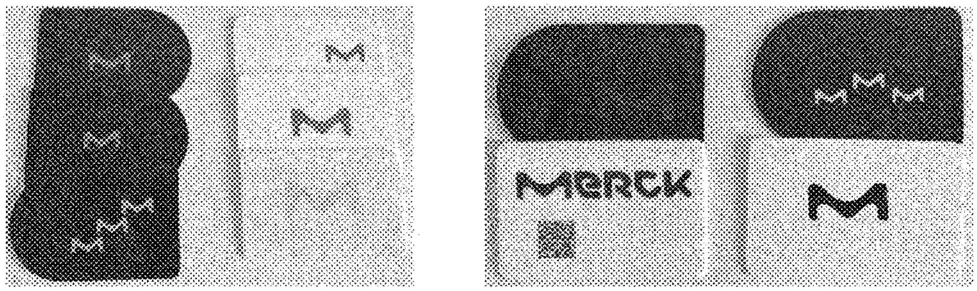
FIG. 4: shows colored (left side; from top to bottom: green, red, yellow), right side (left: blue) and achromatic (right side, right: white on black, black on white) labels on black/white PP plastic surfaces, produced with the method according to the invention

Producing a blue printing ink is described as an example of any color layer, without being limited to blue. In FIG. 4, differently colored embodiments (green, red, yellow) are shown.

2.1

For gravure printing: A blue solvent-based gravure printing ink is produced by mixing 30 wt. % of process blue or 30 wt. % of Pantone blue with 70 wt. % of a nitrocellulose lacquer from Siegwerk, adjusted to the appropriate viscosity with ethanol/ethyl acetate and printed with a 60 screen dots/cm gravure printing cylinder on the aluminum-vaporized side of the black carrier film or on a sealing layer.

2.2

For screen printing: A blue water-based screen printing ink is produced by mixing 15 wt. % of Aqua Jet navy blue 522 in Aqua Jet FGLM 093 from Pröll and optionally 1.5 wt. % of L36459 defoamer from Pröll, adjusted to the appropriate viscosity with water and printed with a 61-64 or 77-55 screen on the aluminum-vaporized side of the black carrier film or on a sealing layer.

Example 3: Producing a Color Layer with Effect Pigments (3)

Figure 5:
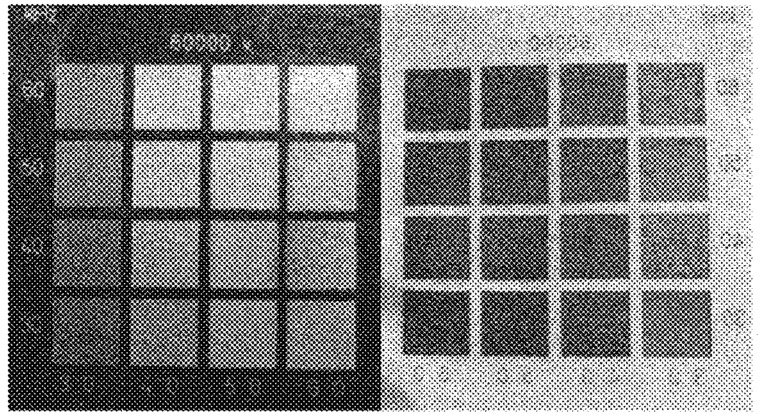
FIG. 5: shows a gold-colored label on a black PP plastic surface (left) with the effect pigment Iriodin® Solar Gold (Merck KGaA) and the associated labeling medium after the laser process (right)

A solvent-based gravure printing ink is produced by mixing 30 wt. % of Iriodin® 305 (Iriodin® Solar Gold) from Merck KGaA with 70 wt. % of a nitrocellulose lacquer from Siegwerk, adjusted to the appropriate viscosity with ethanol/ethyl acetate and printed with a 60 screen dots/cm gravure printing cylinder on the aluminum-vaporized side of the black carrier film or on the sealing layer (for results after carrying out the method according to the invention, see FIG. 5).

Example 4: Producing an Adhesive Layer (3")

The adhesive layer (3") is optionally applied to the color layer (3) in order to strengthen the adhesion of the labeling medium to the plastic surface. For this purpose, polymer-containing films known to a person skilled in the art are used, which soften under the action of heat from the laser radiation and bond with the plastic surface.

For example, a solvent mixture of acetone and toluene at a ratio of 1:3 is prepared, in which 5 wt. % of PVC powder is dissolved, and the mixture is homogenized. The mixture is then applied to the color layer (3) with a 60 screen dots/cm gravure printing cylinder.

The layer thicknesses of the individual layers in the transfer media of the examples are in each case set in the ranges 10-75 μm for the black carrier film, 40-45 nm for the aluminum layer, 4-9 μm for the sealing layer, 2-12 μm for the color layer, and 0.3 to 2 μm for the adhesive layer of the labeling medium.

Figure 1:
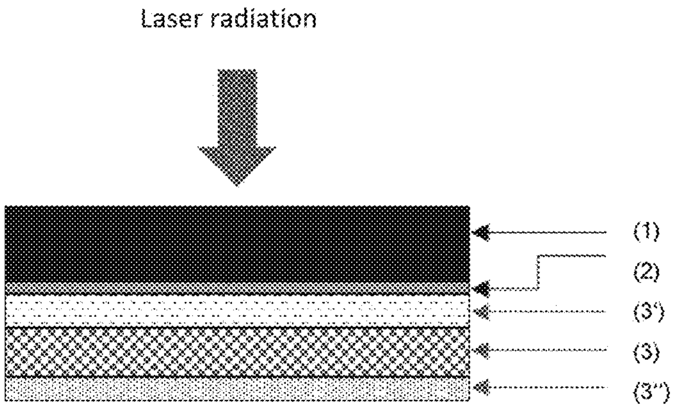
FIG. 1: shows the basic layer structure of a transfer medium according to the invention with a three-layer labeling medium containing color layer (3), adhesive layer (3") and sealing layer (3')
Figure 2:
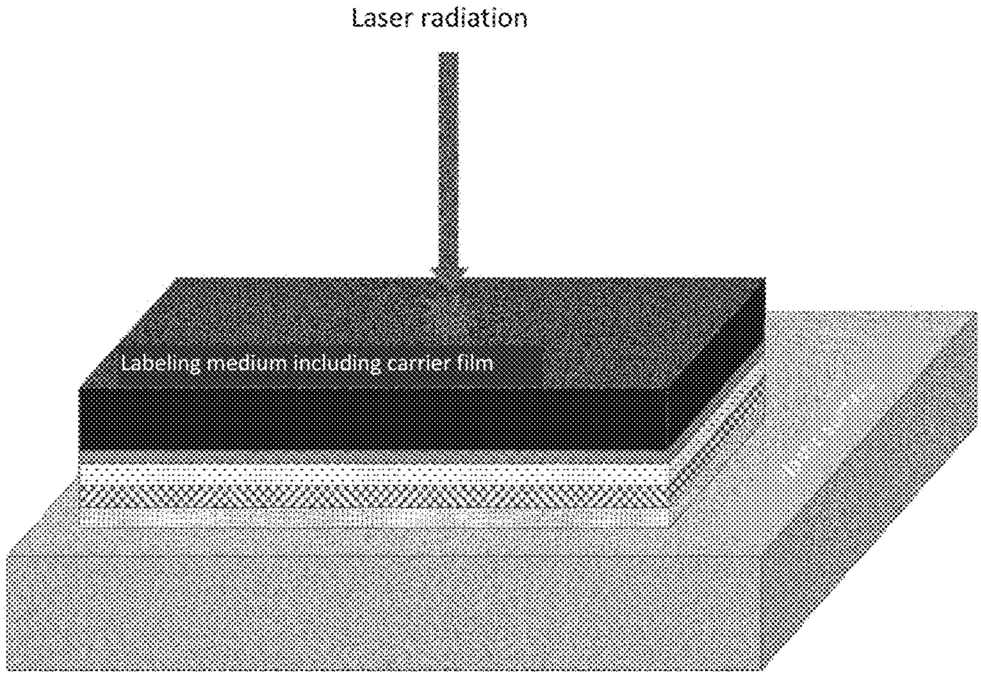
FIG. 2: schematically shows the laser process with the transfer medium applied to the plastic surface and the effect of the laser radiation on the rear side of the carrier layer (1)
Figure 3:
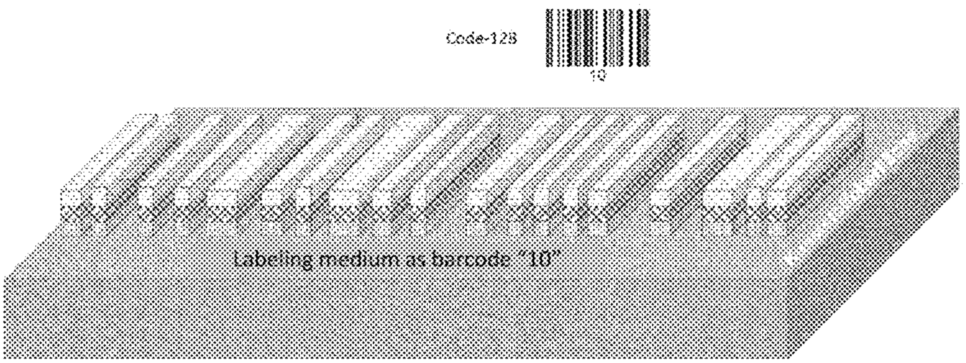
FIG. 3: shows the schematic representation of a lasered barcode (example code 128) on a plastic surface, produced by the laser method according to the invention

For carrying out the method according to the invention, the labeling media are applied to the plastic surface to be labeled and labeled in color with an Nd:yttrium vanadate solid-state laser or a fiber laser (FIG. 2, 3, 4). In order to determine the suitable laser parameters, a test grid is used in each case, which covers the following performance/parameter windows in pulse mode:

1. Nd:$YVO_4$ laser from Trumpf (type VMc 5):
   a. Wavelength: 1,064 nm
   b. Output power: 10 W
   c. Peak pulse power: 10-40 kW (depending on frequency)
   d. Performance in the test grid: 10-100% (based on an output power of 10 W)
   e. Frequency in the test grid: 20-100 kHz
   f. Speed in the test grid: 500-5,000 mm/s
2. Fiber laser from KBA-Metronic (type F-9050, UHS)
   a. Wavelength: 1,062 nm
   b. Output power: 50 W
   c. Peak pulse power: 20 kW (depending on frequency)
   d. Performance in the test grid: 30-100% (based on the output power of 50 W)
   e. Frequency in the test grid: 20-100 kHz
   f. Speed in the test grid: 4,000-60,000 mm/s In this case, the distance between the labeling medium and the plastic surface can be up to 100 μm, preferably up to 75 μm.

It can be stated that colored plastic labels with very high marking speeds of up to 60,000 mm/s (fiber laser) can best be realized using a thinner color layer, e.g., produced with gravure printing.

Very good colored labels can be achieved, e.g., with the following laser parameters (Table 2), without being limited to these laser parameters.

TABLE 2

Laser parameter ranges for plastic labels

| Laser type | Color layer | Power [%] (based on the respective laser output power) | Frequency [kHz] | Speed [mm/s] |
|---|---|---|---|---|
| Nd:$YVO_4$ | Example 2 with screen printing | 60-99 | 20-90 | 2,500-4,000 |
| | Example 2 with gravure printing | 70-90 | 40-80 | 2,500-5,000 |
| Fiber laser | Example 2 with screen printing | 60-100 | 30-70 | 4,000-60,000 |
| | Example 2 with gravure printing | 20-40 | 40-100 | 20,000-60,000 |

The plastic labels shown in FIGS. 4 and 5 are achieved with the following laser parameters (Table 3):

TABLE 3

Laser parameters for colored and achromatic plastic labels and plastic labels with effect pigments (for PP, FIGS. 4 and 5)

| Laser type | Plastic label | Power [%] (based on the respective laser output power) | Frequency [kHz] | Speed [mm/s] |
|---|---|---|---|---|
| Fiber laser | green on black PP | 85 | 40 | 50,000 |
| | red on black PP | 85 | 25 | 30,000 |
| | yellow on black PP | 75 | 25 | 40,000 |
| | green on white PP | 85 | 40 | 50,000 |
| | red on white PP | 85 | 40 | 20,000 |
| | yellow on white PP | 65 | 20 | 45,000 |
| | blue on black PP | 85 | 45 | 30,000 |
| Nd:$YVO_4$ | blue on white PP | 70/65 | 50 | 1,000 |
| | blue on transparent TPU | 75-95 | 10 | 500-750 |
| Fiber laser | white on black PP | 75 | 15 | 50,000 |
| | black on white PP | 90 | 30 | 30,000 |
| | Iriodin ® Solar Gold on black PP | 40-60 | 30-60 | 60,000 |

The invention claimed is:

1. Method for transferring colored markings or labels onto plastic surfaces by means of a laser beam, wherein a multilayer planar transfer medium, having at least one carrier layer (1) containing at least one material which absorbs energy emitted by the laser beam, one metal layer (2) consisting of a sublimable metal and arranged directly on the carrier layer (1), and a labeling medium (3*) arranged directly on a side of the metal layer (2) facing away from the carrier layer (1) and containing at least one color component, is contacted from the side of the carrier layer (1) on a defined surface unit with a pulsed laser beam, wherein the metal of the metal layer completely sublimates in a locally selective manner and the labeling medium (3*) is simultaneously detached from the carrier layer in a locally selective manner, and wherein the labeling medium detached from the carrier layer is transferred to the plastic surface in an adherent manner.

2. Method according to claim 1, characterized in that the carrier layer is a single-or multilayer polymer film, wherein at least one of the layers of the polymer film contains a material which absorbs energy emitted by the laser beam.

3. Method according to claim 1 or 2, characterized in that the material which absorbs energy emitted by the laser beam is carbon, carbon black, anthracene, perylenes, rylenes, pentaerythritol, copper hydroxide phosphates, molybdenum disulfide, antimony (III) oxide, iron oxides, bismuth oxychloride, or coated or uncoated plate-like sheet silicates or graphite platelets.

4. Method according to claim 1, characterized in that the metal layer is a layer made of aluminum, magnesium, copper, tungsten, tin, zinc, silver or gold, having a layer thickness in the range from 1 to <10,000 nm.

5. Method according to claim 4, characterized in that the metal layer has a layer thickness in the range from 3 to 50 nm.

6. Method according to claim 1, characterized in that the labeling medium (3*) has a multilayer structure and at least one layer that contains the color component (3) and at least one further layer that represents a sealing layer (3'') and/or an adhesive layer (3').

7. Method according to claim 1, characterized in that a laser is used to generate the pulsed laser beam, the frequency-dependent pulse energy of which generates an energy input into the metal layer that is greater than the specific enthalpy of sublimation $\Delta H_{sub}$ of the metal of the metal layer.

8. Method according to claim 7, characterized in that the laser is a pulsed solid-state laser or a pulsed fiber laser with emission wavelengths of 534 nm or 1064/1062 nm.

9. Method according to claim 1, characterized in that the at least one color component in the labeling medium (3*) is selected from the group consisting of organic and inorganic colorants.

10. Method according to claim 9, characterized in that the organic colorants are azo pigments, azo dyes, perinones, perylenes, anthraquinones, flavanthrones, isoindolinones, pyranthrones, anthrapyrimidines, quinacridones, thioindigo, dioxazines, indanthrones, diketopyrrolopyrroles, quinophthalones, phthalocyanines, azo complexes, azomethine complexes, dioxime complexes, isoindolinone complexes, and/or carbon black.

11. Method according to claim 9, characterized in that the inorganic colorants are metal pigments, oxide pigments, oxide hydroxide pigments, oxide mixed-phase pigments, metal salt pigments, sulfide or sulfide selenium pigments, complex salt pigments, silicate pigments and/or plate-like effect pigments.

12. Method according to claim 1, characterized in that it is carried out at a write speed in the range from 500 to 60,000 mm/s.

13. Article containing a plastic surface which is laser-marked or laser-labeled using a method according to claim 1.

14. Article according to claim 13, characterized in that it is an article made of plastic or an article having at least one surface made of plastic.

15. Transfer medium for the adherent transfer of colored markings or labels onto plastic surfaces by means of a laser beam, which has a multilayer structure and at least one carrier layer (1) containing at least one material which absorbs energy emitted by the laser beam, one metal layer (2) consisting of a sublimable metal which on contact sublimates with the laser beam in a locally selective manner and arranged directly on the carrier layer (1), and a labeling medium (3*) arranged directly on a side of the metal layer (2) facing away from the carrier layer (1) and containing at least one color component.

16. Transfer medium according to claim 15, characterized in that the metal layer is a layer made of aluminum, magnesium, copper, tungsten, tin, zinc, silver or gold, having a layer thickness in the range from 1 to <10,000 nm.

17. Transfer medium according to claim 15 or 16, characterized in that the labeling medium (3*) has a multilayer structure and at least one layer that contains the color component (3) and at least one further layer that represents a sealing layer (3') and/or an adhesive layer (3").

18. Transfer medium according to claim 15, characterized in that the at least one color component in the labeling medium (3*) is selected from the group consisting of organic and inorganic colorants.

* * * * *